United States Patent
Kurihara

(10) Patent No.: US 9,903,454 B2
(45) Date of Patent: Feb. 27, 2018

(54) TRAVELING AXLE DEVICE

(71) Applicant: Hitachi Construction Machinery Co., Ltd., Toyko (JP)

(72) Inventor: Takeshi Kurihara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 103 days.

(21) Appl. No.: 15/059,361

(22) Filed: Mar. 3, 2016

(65) Prior Publication Data

US 2017/0082182 A1    Mar. 23, 2017

(30) Foreign Application Priority Data

Sep. 18, 2015  (JP) ................................. 2015-184970

(51) Int. Cl.
*B60K 17/16*  (2006.01)
*F16H 37/08*  (2006.01)
(Continued)

(52) U.S. Cl.
CPC ......... *F16H 37/082* (2013.01); *B60K 17/046* (2013.01); *B60K 17/165* (2013.01);
(Continued)

(58) Field of Classification Search
CPC ...... B60K 17/16; B60K 17/165; F16H 37/082
See application file for complete search history.

(56) References Cited

U.S. PATENT DOCUMENTS 3,365,986 A * 1/1968 Mazziotti ............. B60K 17/046
                                                 180/372
4,140,198 A * 2/1979 Chamberlain ....... B60K 17/046
                                                 180/370
(Continued)

FOREIGN PATENT DOCUMENTS

EP      1 631 470 B1    5/2004
JP      61-146464 U     9/1986
(Continued)

OTHER PUBLICATIONS

European Search Report issued in counterpart European Application No. 16157268.0 dated Nov. 18, 2016 (11 pages).

*Primary Examiner* — Tisha Lewis
(74) *Attorney, Agent, or Firm* — Crowell & Moring LLP

(57) ABSTRACT

A reduction gear case (29) of a planetary gear reduction mechanism (28) is mounted on a reduction gear mounting part (18C) of an axle tube (18). A carrier (33) is provided with a wheel mounting part (33B) projecting outside of the reduction gear case (29). A wheel (2) is mounted on the wheel mounting part (33B) and an oil seal (39) is disposed between an outer peripheral surface of the wheel mounting part (33B) and an inner peripheral surface of the front wheel (2) of the reduction gear case (29). As a result, the oil seal (39) can be exposed by removing the front wheel (2) from the wheel mounting part (33B) in the carrier (33). On the other hand, a brake mechanism (40) is disposed on the inner peripheral side of the reduction gear mounting part (18C). Therefore, the brake mechanism (40) can be exposed by removing the front wheel (2) from the wheel mounting part (33B) in the carrier (33) and the planetary gear reduction mechanism (28) from the reduction gear mounting part (18C).

6 Claims, 11 Drawing Sheets

(51) Int. Cl.
   *F16D 55/36* (2006.01)
   *F16H 48/08* (2006.01)
   *F16H 48/22* (2006.01)
   *F16H 57/025* (2012.01)
   *F16H 57/037* (2012.01)
   *F16H 57/04* (2010.01)
   *F16H 57/08* (2006.01)
   *B60K 17/04* (2006.01)
   *F16D 55/00* (2006.01)
   *F16H 57/00* (2012.01)

(52) U.S. Cl.
   CPC ............ *F16D 55/00* (2013.01); *F16D 55/36* (2013.01); *F16H 48/08* (2013.01); *F16H 48/22* (2013.01); *F16H 57/00* (2013.01); *F16H 57/025* (2013.01); *F16H 57/037* (2013.01); *F16H 57/0486* (2013.01); *F16H 57/082* (2013.01); *B60Y 2200/415* (2013.01); *B60Y 2400/406* (2013.01); *B60Y 2400/4244* (2013.01)

(56) References Cited

U.S. PATENT DOCUMENTS 4,160,497 A    7/1979  Galicher
4,186,626 A *  2/1980  Chamberlain ....... B60K 17/046
                                                180/344

FOREIGN PATENT DOCUMENTS

| JP | 10-89390 A | 4/1998 | |
| JP | 5210004 B2 * | 6/2013 | ............ B60K 17/00 |
| WO | 2004/108460 A1 | 12/2004 | |

* cited by examiner

TRAVELING AXLE DEVICE

TECHNICAL FIELD

The present invention relates to a traveling axle device that is used suitably in a wheel type construction machine, such as a wheel loader or a wheel type hydraulic excavator.

BACKGROUND ART

In general, for example, a wheel loader is known as a representative example of a wheel type construction machine. In this wheel loader, a front vehicle body having front wheels and a rear vehicle body having rear wheels are connected through a connecting mechanism to be capable of swinging in the left-right direction. A working device including a loader bucket and the like is attached on the front vehicle body, and a cab, an engine, a power transmission device, a hydraulic pump and the like are mounted on the rear vehicle body.

Traveling axle devices are mounted respectively on the front vehicle body and the rear vehicle body of the wheel loader to rotate left and right wheels, and rotation of an engine is transmitted through a vehicular power transmission device to the axle devices. Therefore, the left and right wheels rotate to cause the wheel loader to travel. The traveling axle device is configured of a casing having a differential case and left and right axle tubes extending from the differential case to both the sides in the left-right direction, a differential mechanism provided in the differential case of the casing, left and right axle shafts provided in the respective axle tubes of the casing to transmit rotations distributed by the differential mechanism to the left and right wheels, and left and right brake mechanisms for imparting braking forces to the left and right axle shafts.

Reduction gear cases are disposed on the wheel sides of the left and right axle tubes, and planetary gear reduction mechanisms are respectively disposed in the reduction gear cases. The planetary gear reduction mechanism reduces the rotation of the axle shaft, which will be transmitted to the wheel. Lubricating oil is filled in the reduction gear case to lubricate the planetary gear reduction mechanism and the like. This lubricating oil is sealed by an oil seal disposed in the reduction gear case (Patent Documents 1 to 3).

PRIOR ART DOCUMENTS

Patent Documents

Patent Document 1: Japanese Utility Model Laid-Open No. Sho61-146464 U
Patent Document 2: Japanese Patent Laid-Open No. Hei10-89390 A
Patent Document 3: European Patent No. 1631470 B

SUMMARY OF THE INVENTION

However, in an axle device according to Patent Document 3, a wheel is removed from an output flange attached on a carrier of a planetary gear reduction mechanism in a case of performing a maintenance work to an oil seal, such as inspection, replacement or the like thereof. Thereafter, the output flange is removed from the carrier to expose the oil seal to the outside of the reduction gear case. In addition, in a case of performing a maintenance work to a brake mechanism, the wheel is removed from the output flange attached on the carrier of the planetary gear reduction mechanism and an assembly of the planetary gear reduction mechanism is removed from an axle tube. Thereafter, a planetary gear is further removed from the carrier of the planetary gear reduction mechanism to expose the brake mechanism to the outside of the reduction gear case.

In this way, the conventional axle device has a problem that, in a case of performing the maintenance work to the oil seal, the brake mechanism or the like, there are many works for removing components around the oil seal or the brake mechanism to deteriorate workability of the maintenance work.

The present invention is made in view of the aforementioned problem in the conventional technologies, and an object of the present invention is to provide a traveling axle device that can enhance workability upon performing the maintenance work to an oil seal, a brake mechanism, or a planetary gear reduction mechanism.

The present invention is applied to a traveling axle device comprising a casing mounted on a vehicle body provided with left and right wheels, the casing including a differential case arranged in the intermediate part in the left-right direction and left and right axle tubes extending outside in the left-right direction from the differential case, the axle tube being formed as a reduction gear mounting part at the wheel side, a differential mechanism disposed in the differential case, left and right axle shafts that extend in the respective axle tubes in the left-right direction and to which rotational forces of a drive source distributed by the differential mechanism are transmitted, left and right planetary gear reduction mechanisms mounted on the reduction gear mounting parts of the left and right axle tubes to reduce rotations of the left and right axle shafts, and left and right brake mechanisms for imparting braking forces to the left and right wheels.

For solving the aforementioned problem, the present invention is characterized in that each of the planetary gear reduction mechanisms includes a cylindrical reduction gear case that is mounted on the reduction gear mounting part of the axle tube and extends outside in the left-right direction from the axle tube to open at the wheel side and in which an internal gear is formed at the inner peripheral side over an entire circumference thereof, a sun gear mounted on the axle shaft and extending along the axial direction of the axle shaft in the reduction gear case, planetary gears that mesh with the sun gear and the internal gear and each perform an orbital motion while rotating around the periphery of the sun gear, a carrier rotating following the orbital motion of the planetary gear, the carrier including planetary gear support parts for rotatably supporting the planetary gears in the reduction gear case and a section axially projecting to the outside of the reduction gear case from the planetary gear support part, the section being formed as a wheel mounting part on which the wheel is removably mounted, a pair of bearings that are mounted in the reduction gear case to interpose the internal gear therebetween in the left-right direction and rotatably support the carrier to the reduction gear case, a retainer that is removably mounted on the carrier to interpose and retain each of the bearings and the reduction gear case between the carrier and the retainer, and an oil seal that is provided between an inner peripheral surface of the reduction gear case at the wheel side and an outer peripheral surface of the wheel mounting part in the carrier to seal the lubricating oil in the reduction gear case, wherein the reduction gear case is removably mounted on the reduction gear mounting part of the axle tube, and the brake mechanism is arranged on the inner peripheral side of the reduction gear mounting part in the axle tube to be retained on the inner peripheral side of the reduction gear mounting part when the reduction gear case is removed from the reduction gear mounting part.

According to the present invention, the reduction gear case is mounted on the reduction gear mounting part positioned at the wheel side of the axle tube, and the oil seal is disposed between the inner peripheral surface of the reduction gear case at the wheel side and the outer peripheral surface of the wheel mounting part of the carrier. Therefore, the oil seal can be accessed and removed from the outside of the reduction gear case simply by removing the wheel from the wheel mounting part in the carrier. As a result, the workability at the time of performing the maintenance work to the oil seal can be enhanced.

On the other hand, in a case of having removed the reduction gear case from the reduction gear mounting part in the axle tube, the brake mechanism retained on the inner peripheral side of the reduction gear mounting part can be accessed, and also the planetary gear reduction mechanism accommodated in the reduction gear case can be accessed. Therefore, inspection, component replacement and the like to the brake mechanism and the planetary gear reduction mechanism can be easily performed simply by removing the reduction gear case from the reduction gear mounting part in the axle tube. As a result, the workability at the time of performing the maintenance work to each of the brake mechanism and the planetary gear reduction mechanism can be enhanced.

MODE FOR CARRYING OUT THE INVENTION

Figure 1:
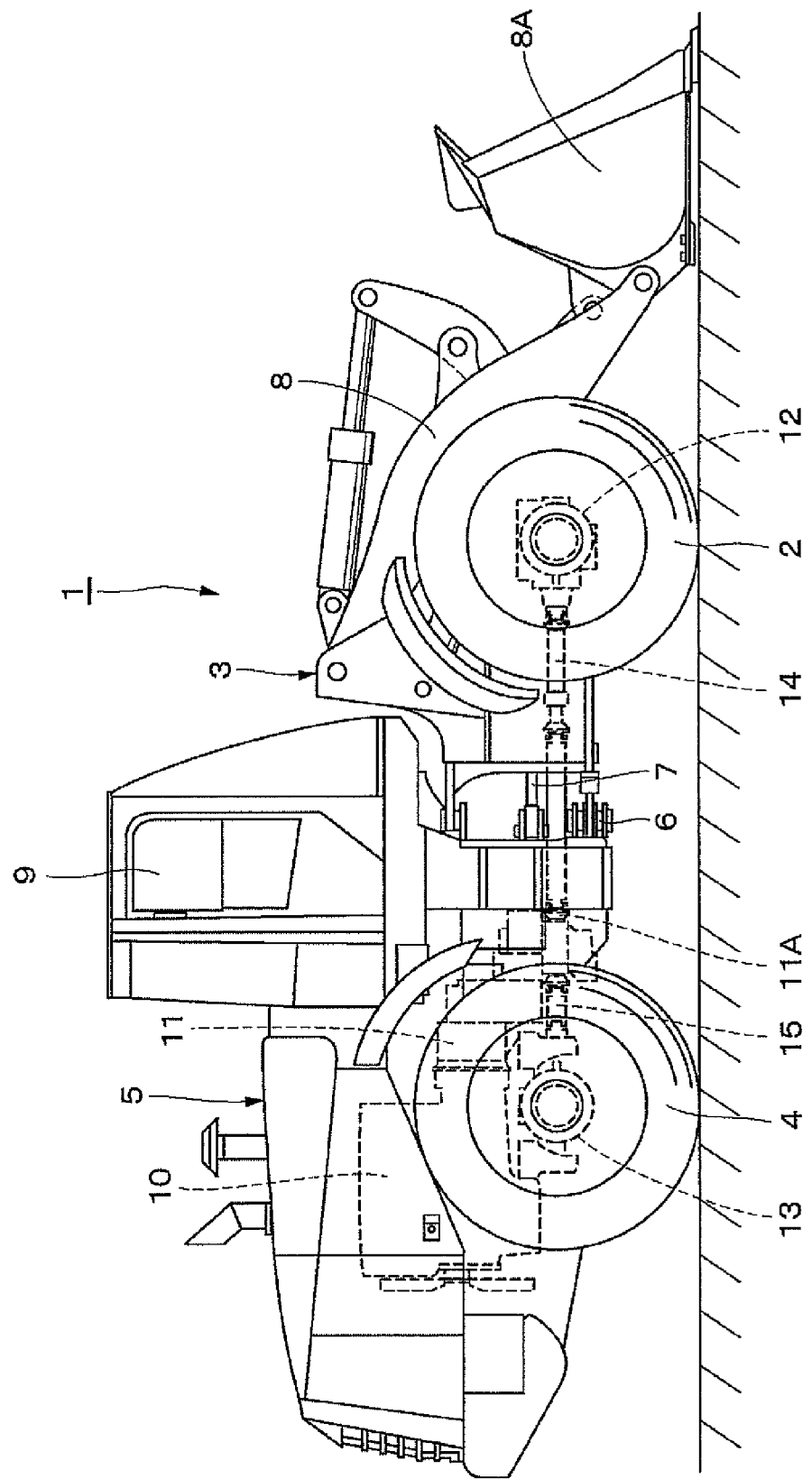
FIG. 1 is a front view illustrating a wheel loader on which traveling axle devices according to the present invention are mounted.

Hereinafter, traveling axle devices according to embodiments in the present invention will be in detail explained with reference to FIG. 1 to FIG. 11 by taking a case where each is mounted on a wheel loader as an example.

FIG. 1 to FIG. 7 illustrate a traveling axle device according to a first embodiment of the present invention. In the figure, indicated at 1 is a wheel loader as a representative example of a wheel type construction machine. The wheel loader 1 includes a front vehicle body 3 provided with left and right front wheels 2 and a rear vehicle body 5 provided with left and right rear wheels 4. The wheel loader 1 is configured as an articulate type working vehicle in which the front vehicle body 3 and the rear vehicle body 5 are connected through a connecting mechanism 6 to be capable of bending in the left-right direction. A steering cylinder 7 is disposed between the front vehicle body 3 and the rear vehicle body 5, and expansion/contraction of the steering cylinder 7 enables the front vehicle body 3 and the rear vehicle body 5 to bend in the left-right direction, thus performing the steering of the wheel loader 1 at the traveling.

A working mechanism 8 equipped with a loader bucket 8A is disposed in the front vehicle body 3 of the wheel loader 1 to be capable of tilting/lifting thereto. On the other hand, a cab 9 that defines an operating room, an engine 10 as a prime mover, a power transmission device 11, a hydraulic pump (not illustrated), and the like are disposed in the rear vehicle body 5 of the wheel loader 1. The power transmission device 11 is connected to the engine 10 to change rotation output of the engine 10. The changed rotation output is transmitted to a front axle device 12 and a rear axle device 13, which will be described later, in a state where the rotational direction is changed in the forward direction or in the backward direction.

The front axle device 12 extending in the left-right direction as the front-side traveling axle device is provided under the front vehicle body 3. The left and right front wheels 2 are provided on both end sides of the front axle device 12. On the other hand, the rear axle device 13 extending in the left-right direction as the rear-side traveling axle device is provided under the rear vehicle body 5. The left and right rear wheels 4 are provided on both end sides of the rear axle device 13. The front axle device 12 is connected through a propeller shaft 14 to an output shaft 11A of the power transmission device 11. The rear axle device 13 is connected through a propeller shaft 15 to the output shaft 11A of the vehicular power transmission device 11.

Figure 2:
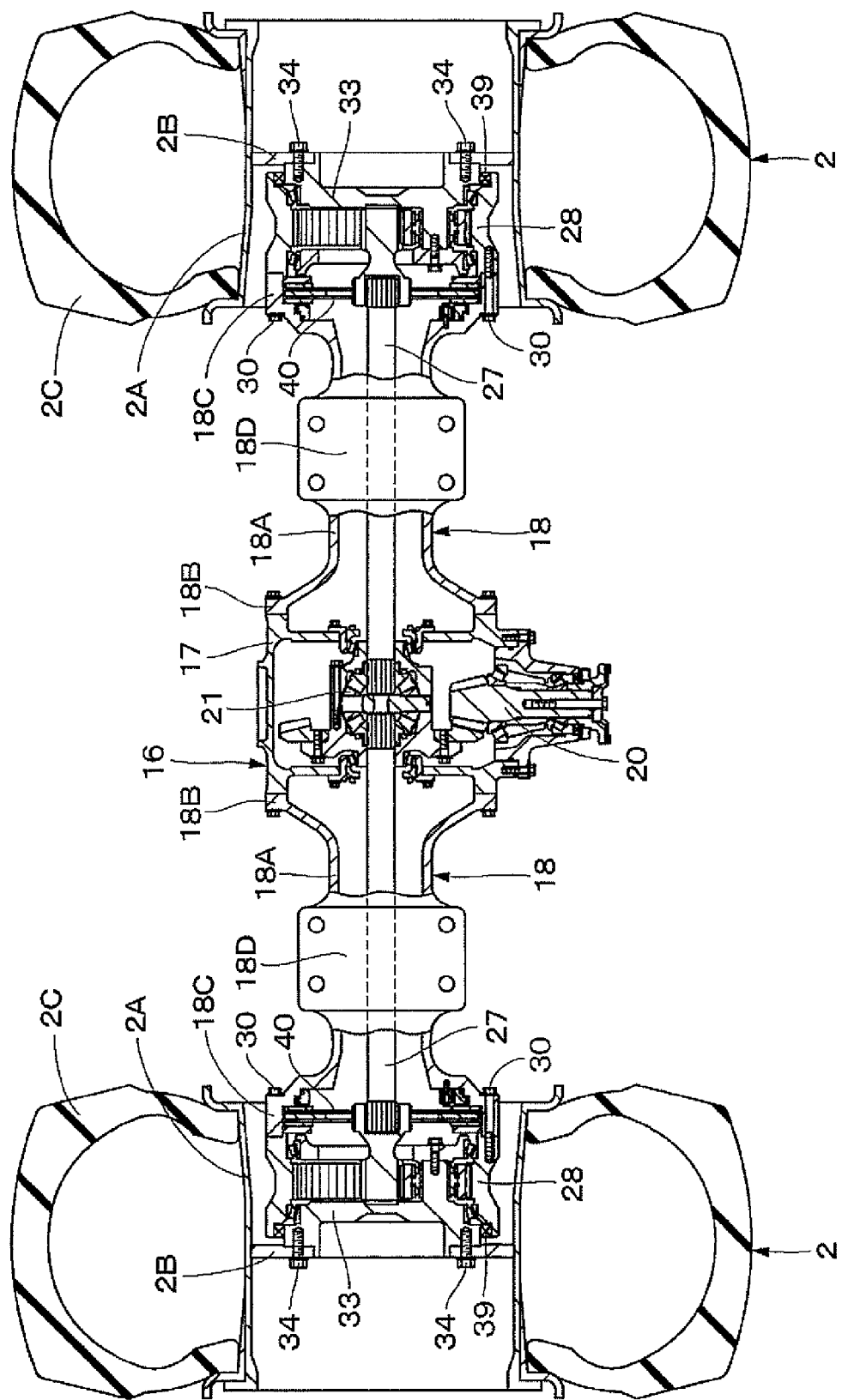
FIG. 2 is a cross sectional view illustrating a traveling axle device according to a first embodiment.

As illustrated in FIG. 2, the front axle device 12 extends in the left-right direction. The front axle device 12 is provided with the left and right front wheels 2 at both ends thereof in the left-right direction. Here, the front wheel 2 includes a cylindrical rim 2A extending in the left-right direction, an annular mounting flange 2B disposed on the inner peripheral side of the rim 2A, and a tire 2C mounted on the outer peripheral side of the rim 2A. The mounting flange 2B in the front wheel 2 is mounted to a carrier 33 of a planetary gear reduction mechanism 28 to be described later. On the other hand, the rear axle device 13 is arranged under the rear vehicle body 5 to extend in the left-right direction. The rear axle device 13 is provided with left and right rear wheels 4 at both ends thereof in the left-right direction.

Here, the front axle device 12 is configured to be substantially similar to the rear axle device 13. Therefore, in the present embodiment, the configuration of the front axle device 12 will be explained in detail, and the explanation of the rear axle device 13 is omitted.

The front axle device 12 is connected to the propeller shaft 14 to rotate the left and right front wheels 2. The front axle device 12 is, as illustrated in FIG. 2, configured of a casing 16, a differential mechanism 21, left and right axle shafts 27, left and right planetary gear reduction mechanisms 28, and left and right brake mechanisms 40.

The casing 16 is disposed in a lower surface side of the front vehicle body 3 to extend in the left-right direction and configures an outer shell of the front axle device 12. The casing 16 is configured of a differential case 17 arranged in the intermediate part in the left-right direction and left and right axle tubes 18 disposed at the left and right sides of the differential case 17. The differential mechanism 21 to be described later is accommodated in the differential case 17. The left and right axle tubes 18 extend to the outside in the left-right direction from the differential case 17.

Figure 3:
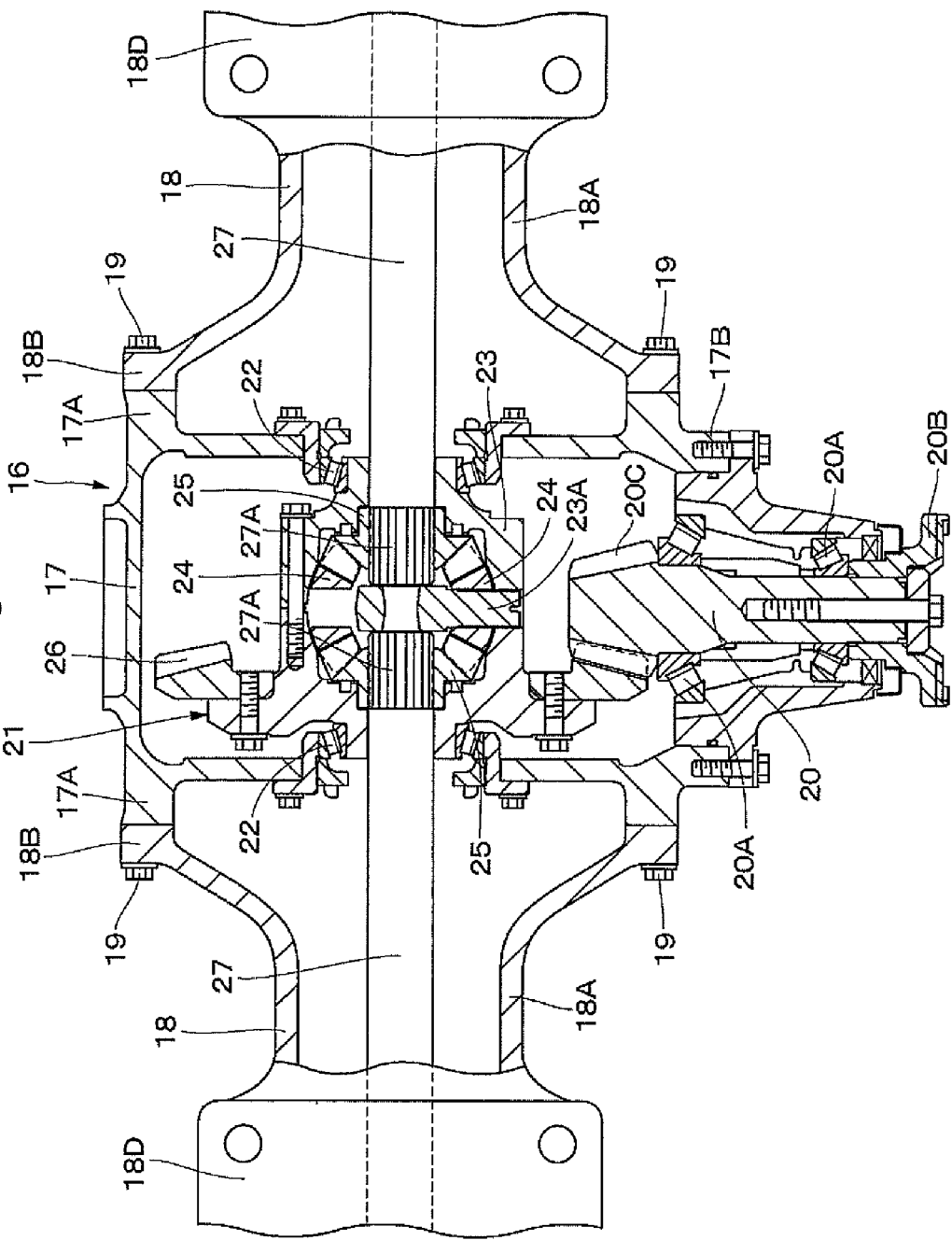
FIG. 3 is an enlarged cross sectional view illustrating a differential mechanism in FIG. 2.

As illustrated in FIG. 3, the differential case 17 is formed in a cylindrical shape, having an axis line extending in an axial direction (left-right direction) of the axle shaft 27 as a whole. Both ends of the differential case 17 in the left-right direction are formed as annular tube mounting parts 17A. The axle tubes 18 are mounted on the left and right tube mounting parts 17A respectively. In addition, a projecting tube 17B projecting backward is disposed in the rear side (rear vehicle body 5 side) of the differential case 17. An input shaft 20 to be described later is rotatably arranged in the projecting tube 17B.

The left and right axle tubes 18 are attached on both left and right sides of the differential case 17 in the left-right direction. Each of the axle tubes 18 extends from the differential case 17 to the outside in the left-right direction in a state where the left and right axle shafts 27 to be described later are accommodated therein. The intermediate part of the axle tube 18 in the left-right direction is formed as a cylindrical part 18A smaller in diameter than the tube mounting part 17A in the differential case 17. Both end sides of the axle tube 18 in the left-right direction are enlarged in diameter in a funnel shape.

Here, the base end part of the axle tube 18 positioned in the differential case 17 side is formed as an annular base end side mounting part 18B. The base end side mounting part 18B is mounted on the tube mounting part 17A in the differential case 17 using a plurality of bolts 19. The distal end part of the axle tube 18 positioned in the front wheel 2 side is formed as a reduction gear mounting part 18C. The planetary gear reduction mechanism 28 to be described later is mounted on the reduction gear mounting part 18C. Further, a vehicle body mount part 18D formed in a rectangular plate shape is disposed to a cylindrical part 18A of the axle tube 18. The vehicle body mount part 18D is fixed to the lower surface side of the front vehicle body 3. Accordingly, the reduction gear mounting part 18C of the axle tube 18 is arranged at the opposite side to the differential case 17 to have the vehicle body mount part 18D therebetween, that is, outside of the front vehicle body 3.

The input shaft 20 is rotatably supported through bearings 20A in the projecting tube 17B of the differential case 17 (refer to FIG. 3). One end side of the input shaft 20 projecting outside of the projecting tube 17B is provided with a flange portion 20B. The flange portion 20B is connected to the propeller shaft 14. In addition, the other end side of the input shaft 20 extending into the differential case 17 is provided with a pinion gear 20C made up of a bevel gear.

The differential mechanism 21 is accommodated in the differential case 17. The differential mechanism 21 distributes rotational forces of the engine 10 that are input thereto through the input shaft 20 to the left and right front wheels 2. Here, the differential mechanism 21 is configured of a gear case 23, a plurality of pinion gears 24 for differential (hereinafter called "pinion gears 24"), left and right side gears 25, and an annular ring gear 26 for differential (hereinafter called "ring gear 26"). The gear case 23 is rotatably supported in the differential case 17 through left and right bearings 22, having an axis line in the left-right direction. The pinion gears 24 are rotatably supported to a spider 23A fixed in the gear case 23. The side gears 25 are disposed in the gear case 23 to be meshed with the pinion gears 24 respectively. The ring gear 26 is attached on the outer peripheral side of the gear case 23.

The ring gear 26 is formed of an annular bevel gear on the inner peripheral side of which the gear case 23 is arranged, and is meshed with a pinion gear 20C of the input shaft 20. The left and right side gears 25 are splined to the left and right axle shafts 27 respectively. In the differential mechanism 21, the rotational force of the engine 10 is transmitted to the gear case 23 through the input shaft 20 and the ring gear 26. As a result, the differential mechanism 21 distributes rotation of the gear case 23 to the left and right axle shafts 27 through the pinion gears 24 and the left and right side gears 25.

The left and right axle shafts 27 are disposed to extend in the left-right direction in the left and right axle tubes 18. The left and right axle shafts 27 transmit the rotational forces of the engine distributed by the differential mechanism 21 to the planetary gear reduction mechanisms 28. Here, the axle shaft 27 is formed of a solid or hollow shaft body extending in the left-right direction. A base end part 27A of the axle shaft 27 positioned in the differential mechanism 21 side is splined to the side gear 25 of the differential mechanism 21. On the other hand, a male spline 27C is formed in a distal end part 27B of the axle shaft 27 positioned in the front wheel 2 side. The male spline 27C is splined to a female spline 31B of a sun gear 31 to be described later (refer to FIG. 4).

Next, an explanation will be made of the left and right planetary gear reduction mechanisms mounted respectively on the reduction gear mounting parts 18C of the left and right axle tubes 18.

Figure 4:
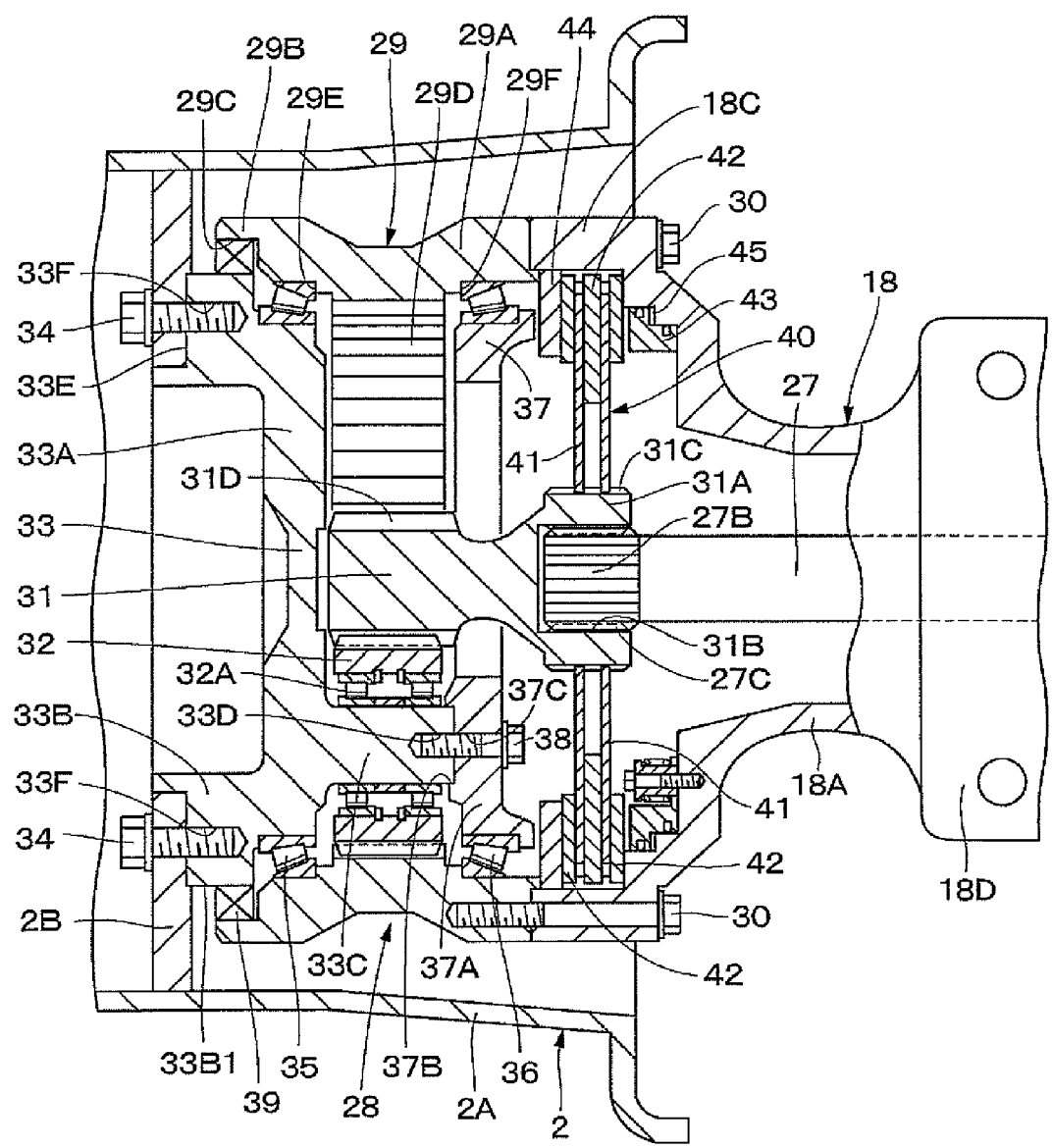
FIG. 4 is an enlarged cross sectional view illustrating a brake mechanism, a planetary gear reduction mechanism and the like in FIG. 2.

The left and right planetary gear reduction mechanisms 28 are mounted to the reduction gear mounting parts 18C of the left and right axle tubes 18 respectively. The planetary gear reduction mechanism 28 reduces rotation of the axle shaft 27 for transmission to the front wheel 2. Here, the planetary gear reduction mechanism 28 is, as illustrated in FIG. 4, configured of a reduction gear case 29, the sun gear 31, each of planetary gears 32, a carrier 33, bearings 35, 36, a retainer 37, an oil seal 39 and the like, which will be described later.

The reduction gear case 29 forms an outer shell of the planetary gear reduction mechanism 28. The reduction gear case 29 is formed in a cylindrical shape, having an axis line in an axial direction (left-right direction) of the axle shaft 27 as a whole. Both ends of the reduction gear case 29 in the axial direction are formed as opening ends. A base end part 29A of the reduction gear case 29 positioned in the differential mechanism 21 side is mounted to the reduction gear mounting part 18C in the axle tube 18 using a plurality of bolts 30. Thereby, a distal end part 29B of the reduction gear case 29 extends from the axle tube 18 to the outside in the left-right direction. In addition, an inner peripheral surface of the distal end part 29B in the reduction gear case 29 is formed as a stepped, cylindrical seal mounting surface 29C for mounting the oil seal 39 to be described later.

On the other hand, an internal gear 29D is disposed on the inner peripheral side and the axial intermediate part of the reduction gear case 29 over an entire circumference thereof. The planetary gear 32 to be described later is meshed with the internal gear 29D. Bearing mounting portions 29E, 29F are disposed at two locations spaced in the left-right direction on the inner peripheral side of the reduction gear case 29 with the internal gear 29D therebetween over an entire circumference thereof.

The sun gear 31 is mounted coaxially with the distal end part 27B in the axle shaft 27. The sun gear 31 extends along the axial direction of the axle shaft 27 in the reduction gear case 29. Here, a cylindrical shaft mounting part 31A is disposed on a base end side of the sun gear 31 positioned in the differential mechanism 21 side. A female spline 31B is formed on the inner peripheral side of the shaft mounting part 31A. The female spline 31B is splined to the male spline 27C in the axle shaft 27. A male spline 31C is formed on the outer peripheral surface of the shaft mounting part 31A over an entire circumference thereof. The male spline 31C is splined on the inner peripheral side of each of rotational disks 41 to be described later. On the other hand, a gear part 31D is formed on the outer periphery of a distal end side of the sun gear 31 positioned at the opposite side to the shaft mounting part 31A (front wheel 2 side) over an entire circumference thereof. The gear part 31D is meshed with the planetary gear 32.

The planetary gear 32 comprises a plurality of planetary gears provided in the reduction gear case 29 (only one is illustrated). Each of the planetary gears 32 is rotatably supported on a gear support projection 33C in the carrier 33 to be described later through bearings 32A. Each of the planetary gears 32 is meshed with the internal gear 29D in the reduction gear case 29 and the sun gear 31 (gear part 31D). Each of the planetary gears 32 performs an orbital motion while rotating around the circumference of the sun gear 31.

The carrier 33 rotatably supports each of the planetary gears 32 in the reduction gear case 29, and rotates with the orbital motion of each of the planetary gears 32. The carrier 33 is configured of a base plate part 33A in a substantially circular plate shape, and a cylindrical wheel mounting part 33B. The base plate part 33A is rotatably supported on the inner peripheral side of the reduction gear case 29 through the bearing 35 to be described later. The wheel mounting part 33B projects toward the outside of the reduction gear case 29 from the base plate part 33A. The front wheel 2 is mounted on the wheel mounting part 33B.

The columnar gear support projection 33C as a planetary gear support part rotatably supporting each of the planetary gears 32 is provided at the brake mechanism 40 side (base end side) of the base plate part 33A, and the columnar gear support projections 33C comprising a plurality of columnar gear support projections are arranged by circumferentially equal intervals (only one is illustrated). For example, one female screw hole 33D is formed in the projecting end surface of each of the gear support projections 33C. On the other hand, the wheel mounting part 33B is provided with a stepped, cylindrical fitting part 33E. The fitting part 33E is fitted (spigot-fitted) in the inner peripheral side of the mounting flange 2B disposed in the rim 2A of the front wheel 2. A plurality of female screw holes 33F are formed on the end surface of the fitting part 33E over an entire circumference thereof. The inner peripheral side of the mounting flange 2B of the front wheel 2 is fitted in the fitting part 33E in the carrier 33. In this state, bolts 34 inserted in the mounting flange 2B are threaded in the female screw holes 33F of the carrier 33 (fitting parts 33E). As a result, the front wheel 2 is mounted on the carrier 33.

The bearings 35, 36 are paired in a state of interposing the internal gear 29D therebetween in the left-right direction, and are disposed on the inner peripheral side of the reduction gear case 29. The pair of bearings 35, 36 respectively are made up of conical roll bearings. Each of the bearings 35, 36 rotatably supports the carrier 33 to the reduction gear case 29. Here, the bearing 35 is disposed between a bearing mounting portion 29E of the reduction gear case 29 and the outer peripheral surface of the base plate part 33A in the carrier 33. The bearing 36 is disposed between a bearing mounting portion 29F of the reduction gear case 29 and the outer peripheral surface of the retainer 37 to be described later.

The retainer 37 is removably mounted on each of the gear support projections 33C disposed in the carrier 33 using bolts 38. The retainer 37 is formed in a hollow disk shape in the inner peripheral side of which the sun gear 31 is inserted. The retainer 37 has a plurality of mounting plate parts 37A mounted to the respective gear support projections 33C. Each of the mounting plate parts 37A is provided with a fitting recess part 37B in which a projecting end of the gear support projections 33C is fitted, and is provided with a bolt through hole 37C. The bolt through hole 37C corresponds to the female screw hole 33D formed in the gear support projection 33C. The fitting recess part 37B disposed in the mounting plate part 37A in the retainer 37 is fitted in each of the gear support projections 33C in the carrier 33. In this state, the bolt 38 inserted in the bolt through hole 37C of the mounting plate part 37A from the brake mechanism 40 side is threaded into the female screw hole 33D in the gear support projection 33C. Thereby, the retainer 37 can be fixed integrally with the carrier 33 to prevent the planetary gear 32 from being pulled out in the axial direction. That is, the retainer 37 forms a part of the carrier 33.

In this way, in a state where the retainer 37 is attached on the carrier 33 using the bolts 38, the bearing 35 is retained between the bearing mounting portion 29E in the reduction gear case 29 and the outer peripheral surface of the carrier 33 (base plate part 33A). On the other hand, the bearing 36 is retained between the outer peripheral surface of the retainer 37 and the bearing mounting portion 29F in the reduction gear case 29. By thus, attaching the retainer 37 on the carrier 33, the pair of the bearings 35, 36 and the reduction gear case 29 are retained to be interposed between the retainer 37 and the carrier 33. As a result, the bearings 35, 36 are axially subjected to pressures.

The oil seal 39 is disposed between the seal mounting surface 29C as the inner peripheral surface of the distal end part 29B in the reduction gear case 29 and an outer peripheral surface 33B1 of the wheel mounting part 33B in the carrier 33. The oil seal 39 is configured of an annular body for closing between the seal mounting surface 29C in the reduction gear case 29 and the outer peripheral surface 33B1 of the carrier 33 over an entire circumference thereof. The oil seal 39 seals lubricating oil in the casing 16 composed of the differential case 17 and the left and right axle tubes 18. Therefore, the differential mechanism 21, the planetary gear reduction mechanism 28 and the like are constantly lubricated by the lubricating oil sealed in the casing 16.

Figure 5:
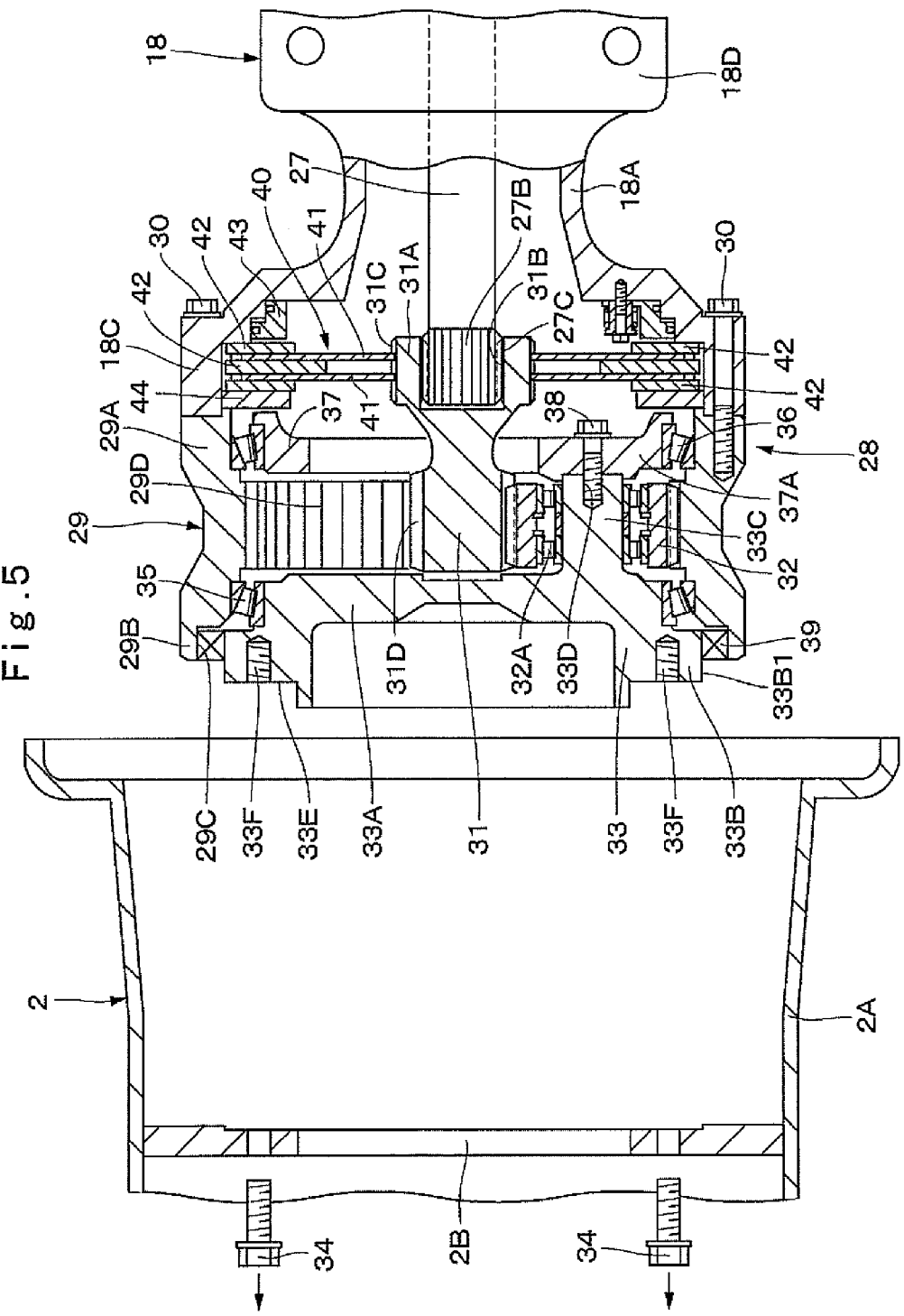
FIG. 5 is a cross sectional view illustrating a state where wheels are removed from the planetary gear reduction mechanism.

Here, the carrier 33 is provided with the wheel mounting part 33B projecting outside of the reduction gear case 29. The mounting flange 2B of the front wheel 2 is mounted on the wheel mounting part 33B using the bolts 34. The oil seal 39 is disposed between the outer peripheral surface 33B1 of the wheel mounting part 33B and the seal mounting surface 29C of the reduction gear case 29. Accordingly, as shown in FIG. 5, only by pulling the bolt 34 out of the female screw hole 33F in the carrier 33 to remove the mounting flange 2B of the front wheel 2, the oil seal 39 can be exposed to the outside of the reduction gear case 29. Therefore, when the maintenance work to the oil seal 39 is performed, the front wheel 2 is removed from the carrier 33 of the planetary gear reduction mechanism 28 in a state where the vehicle body mount part 18D in the axle tube 18 is mounted in the front vehicle body 3 (is not removed therefrom). In this way, the oil seal 39 can be accessed only by removing the front wheel 2 from the carrier 33.

The brake mechanism 40 is disposed on the inner peripheral side of the reduction gear mounting part 18C provided in the axle tube 18. The brake mechanism 40 is configured of, for example, a wet multiple plate brake mechanism, and imparts braking forces to the left and right wheels 2 and 4. Here, the brake mechanism 40 is configured of a plurality of rotational disks 41, a plurality of non-rotational disks 42, a brake piston 43 and an end plate 44. Each of the rotational disks 41 rotates together with the axle shaft 27. Each of the non-rotational disks 42 is mounted on the inner periphery of the front wheel 2 side (distal end side) of the axle tube 18 in a non-rotational state. The brake piston 43 pushes the non-rotational disk 42 against the rotational disk 41. The end plate 44 holds the rotational disk 41 and the non-rotational disk 42 between the end plate 44 and the brake piston 43 in a state of abutting on the base end part 29A in the reduction gear case 29.

Each of the rotational disks 41 is axially movable to the axle shaft 27 in a non-rotational state by being meshed with the male spline 31C of the sun gear 31. Each of the non-rotational disks 42 is splined to the inner peripheral side of the reduction gear mounting part 18C disposed in the front wheel 2 side (distal end side) of the axle tube 18. Each of the non-rotational disks 42 is axially movable to the axle tube 18 in a non-rotational state. Each of the non-rotational disks 42 is arranged in a state of alternately overlapping each of the rotational disks 41 in the axial direction, and faces with each other to have each of the rotational disks 41 therebetween in the left-right direction.

Figure 6:
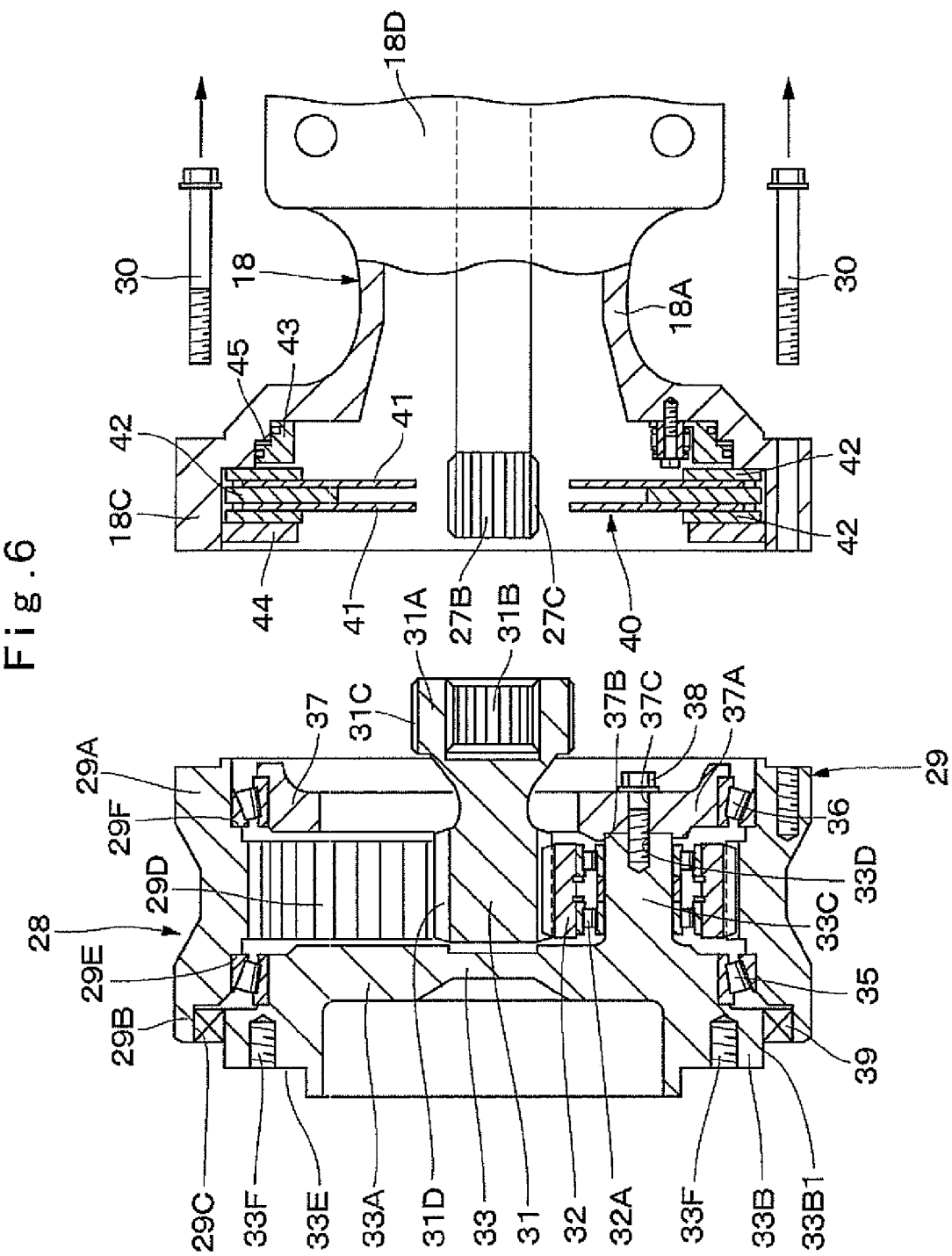
FIG. 6 is a cross sectional view illustrating a state where a reduction gear case is removed from an axle tube.

Here, the brake mechanism 40 is disposed on the inner peripheral side of the reduction gear mounting part 18C disposed in the front wheel 2 side (distal end side) of the axle tube 18. Therefore, as illustrated in FIG. 6, when the bolt 30 is pulled out of the reduction gear mounting part 18C of the axle tube 18 to remove the reduction gear case 29 of the planetary gear reduction mechanism 28, the brake mechanism 40 is retained on the inner peripheral side of the reduction gear mounting part 18C in the axle tube 18. Therefore, when the maintenance work to the brake mechanism 40 is performed, the planetary gear reduction mechanism 28 is removed from the axle tube 18 in a state where the axle tube 18 is mounted in the front vehicle body 3 (is not removed therefrom). In this way, the brake mechanism 40 can be accessed only by removing the planetary gear reduction mechanism 28.

On the other hand, as described above, it is possible to easily perform the maintenance work to the planetary gear reduction mechanism 28 by independently removing only the planetary gear reduction mechanism 28 from the reduction gear mounting part 18C of the axle tube 18.

The brake mechanism 40 moves the brake piston 43 toward the end plate 44 with supply of pressurized oil into a brake oil chamber 45 in response to an operation to a brake pedal (not illustrated), for example. Thereby, each of the rotational disks 41 and each of the non-rotational disks 42 are tightly held between the brake piston 43 and the end plate 44. Therefore, it is possible to impart braking forces to the axle shaft 27 with frictional engagement between each of the rotational disks 41 and each of the non-rotational disks 42.

The front axle device 12 according to the first embodiment is configured as described above, and hereinafter an explanation will be made of an operation of the front axle device 12 at the traveling of the wheel loader 1.

When an operator who has got in a cab 9 operates the engine 10, rotational forces of the engine 10 are transmitted to the input shaft 20 through the power transmission device 11 and the propeller shaft 14. The rotation of the input shaft 20 is transmitted from the pinion gear 20C to the ring gear 26 in the differential mechanism 21. As a result, the gear case 23 on which the ring gear 26 is mounted rotates.

The pinion gear 24 supported in the gear case 23 through the spider 23A rotates together with the gear case 23. The rotation of the pinion gear 24 is transmitted to the left and right side gears 25. Therefore, the left and right axle shafts 27 splined to each of the side gears 25 respectively rotate. The rotation of the axle shaft 27 is reduced by the planetary gear reduction mechanism 28, and is transmitted to the left and right front wheels 2 mounted to the carrier 33 in the planetary gear reduction mechanism 28. Thereby, the left and right front wheels 2 are rotated to travel the wheel loader 1.

On the other hand, when the brake pedal (not illustrated) is operated at the traveling of the wheel loader 1, the pressurized oil is supplied into the brake oil chamber 45 to move the brake piston 43 toward the end plate 44. Thereby, each of the non-rotational disks 42 is pushed against each of the rotational disks 41 by the brake piston 43 to perform frictional engagement between each of the rotational disks 41 and each of the non-rotational disks 42. Therefore, the braking force is imparted to the axle shaft 27, thus making it possible to stop the traveling of the wheel loader 1.

Next, an explanation will be made of the working procedure at the time of performing the maintenance work of inspection, component replacement and the like to each of the oil seal 39, the brake mechanism 40 and the planetary gear reduction mechanism 28 configuring the front axle device 12.

In a case of performing the maintenance work to the oil seal 39, the axle tube 18 is preliminarily mounted in the lower surface side of the front vehicle body 3. In this state, as illustrated in FIG. 5, an operation pulls the bolts 34 out of the female screw holes 33F of the carrier 33 configuring the planetary gear reduction mechanism 28 and removes the front wheel 2 (mounting flange 2B) from the wheel mounting part 33B of the carrier 33. Thereby, the operator can easily access to the oil seal 39 disposed between the outer peripheral surface 33B1 of the wheel mounting part 33B and the seal mounting surface 29C of the reduction gear case 29. Accordingly, it is possible to quickly and easily perform the inspection work and the replacement work to the oil seal 39 to enhance the workability of the maintenance work.

Next, in a case of performing the maintenance work to the brake mechanism 40, the axle tube 18 is preliminarily mounted in the lower surface side of the front vehicle body 3. In this state, after an operator removes the front wheel 2 from the carrier 33 of the planetary gear reduction mechanism 28, as illustrated in FIG. 6, the operator pulls the bolts 30 out of reduction gear mounting part 18C in the axle tube 18 to remove the reduction gear case 29 of the planetary gear reduction mechanism 28. In this state, the brake mechanism 40 is retained on the inner peripheral side of the reduction gear mounting part 18C in the axle tube 18 and is exposed to the outside. Thereby, the operator can easily access the brake mechanism 40 retained in the reduction gear mounting part 18C in the axle tube 18. Accordingly, for example, it is possible to quickly and easily perform the inspection work and the replacement work to the rotational disk 41 and the non-rotational disk 42 to enhance the workability of the maintenance work.

Figure 7:
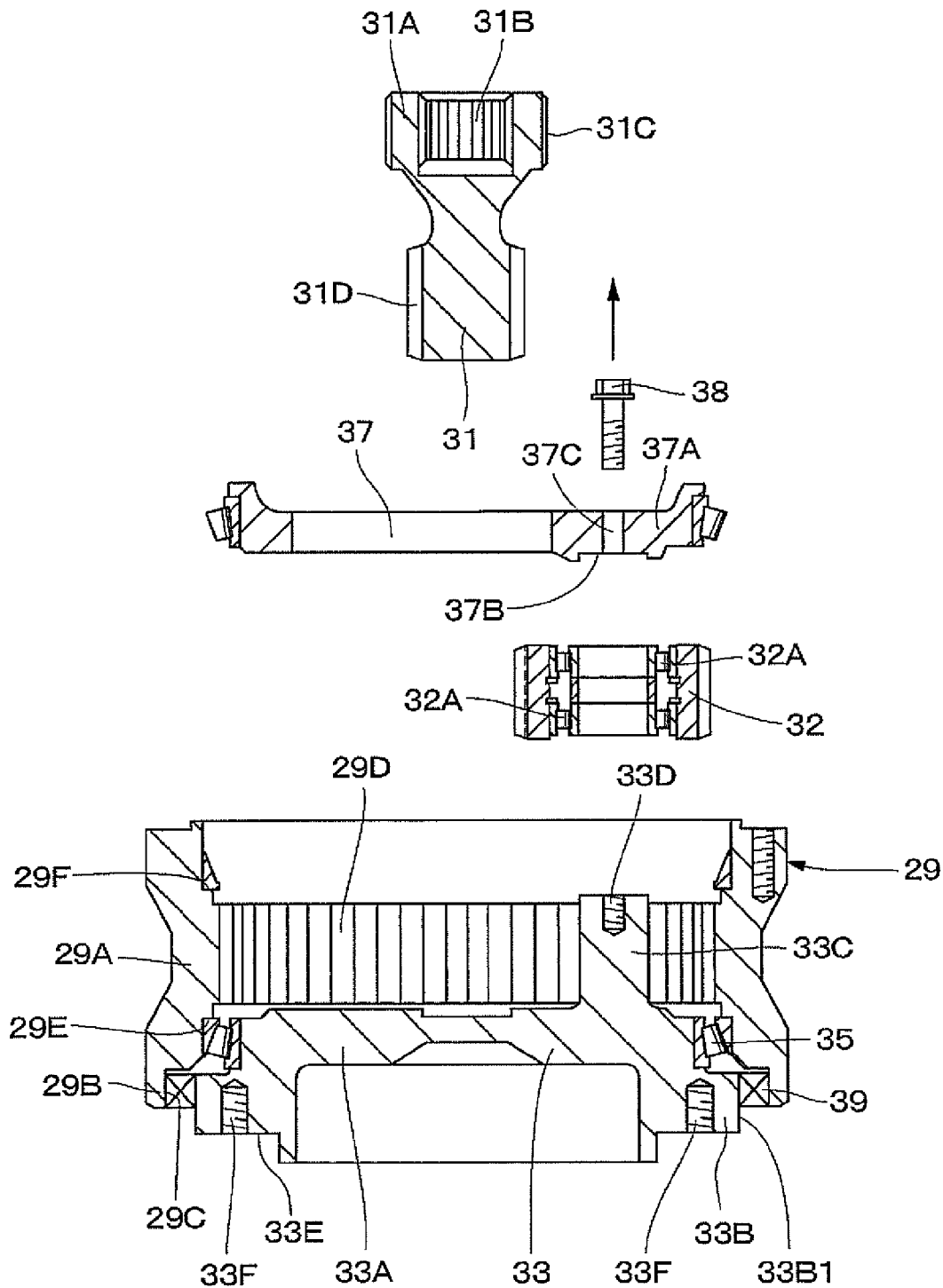
FIG. 7 is a cross sectional view illustrating a state where a sun gear, a retainer, and a planetary gear are removed from the reduction gear case.

Next, in a case of performing the maintenance work to the planetary gear reduction mechanism 28, the axle tube 18 is preliminarily mounted in the lower surface side of the front vehicle body 3. In this state, the operator, as illustrated in FIG. 5, removes the front wheel 2 from the carrier 33 of the planetary gear reduction mechanism 28, and as illustrated in FIG. 6, removes the planetary gear reduction mechanism 28 from the reduction gear mounting part 18C in the axle tube 18. In this way, the planetary gear reduction mechanism 28 is independently removed from the reduction gear mounting part 18C in the axle tube 18. As a result, for example, as illustrated in FIG. 7, it is possible to stably place the planetary gear reduction mechanism 28 to the working site in a state where the carrier 33 is arranged to the lower side. After the operator removes the sun gear 31 meshing with each of the planetary gears 32 and pulls the bolts 38 out of the respective gear support projections 33C of the carrier 33 to remove the retainer 37 in this state, it is possible to remove the planetary gear 32 from each of the gear support projections 33C. In addition, the reduction gear case 29 may be removed before removing the planetary gear 32. Thereby, it is possible to quickly and easily perform the inspection work and the replacement work to each of the sun gear 31, the planetary gear 32, the internal gear 29D, the bearing 32A and the like to enhance the workability of the maintenance work.

In this way, the front axle device 12 according to the first embodiment is configured such that the carrier 33 configuring the planetary gear reduction mechanism 28 is provided with the wheel mounting part 33B projecting outside of the reduction gear case 29, and the mounting flange 2B in the front wheel 2 is mounted to the wheel mounting part 33B. Further, the oil seal 39 is disposed between the outer peripheral surface 33B1 of the wheel mounting part 33B in the carrier 33 and the seal mounting surface 29C of the reduction gear case 29.

Thereby, in a case of performing the maintenance work to the oil seal 39, only by removing the front wheel 2 from the wheel mounting part 33B in the carrier 33 in a state where the axle tube 18 is mounted to the front vehicle body 3, the oil seal 39 can be exposed to the outside. Accordingly, it is possible to enhance the workability of the maintenance work to the oil seal 39.

On the other hand, the front axle device 12 is configured such that the reduction gear mounting part 18C is disposed to the front wheel 2 side (distal end side) of the axle tube 18 and the planetary gear reduction mechanism 28 is mounted to the reduction gear mounting part 18C using the bolts 30. Further, the brake mechanism 40 is arranged on the inner peripheral side of the reduction gear mounting part 18C.

As a result, in a case of performing the maintenance work to the brake mechanism 40, the brake mechanism 40 can be exposed to the outside only by removing the planetary gear reduction mechanism 28 from the reduction gear mounting part 18C in the axle tube 18 in a state where the axle tube 18 is mounted on the front vehicle body 3. Further, it is possible to independently place the removed planetary gear reduction mechanism 28 to the working site. As a result, it is possible to enhance the maintenance work to the brake mechanism 40 and the workability of the maintenance work to the planetary gear reduction mechanism 28.

Figure 8:
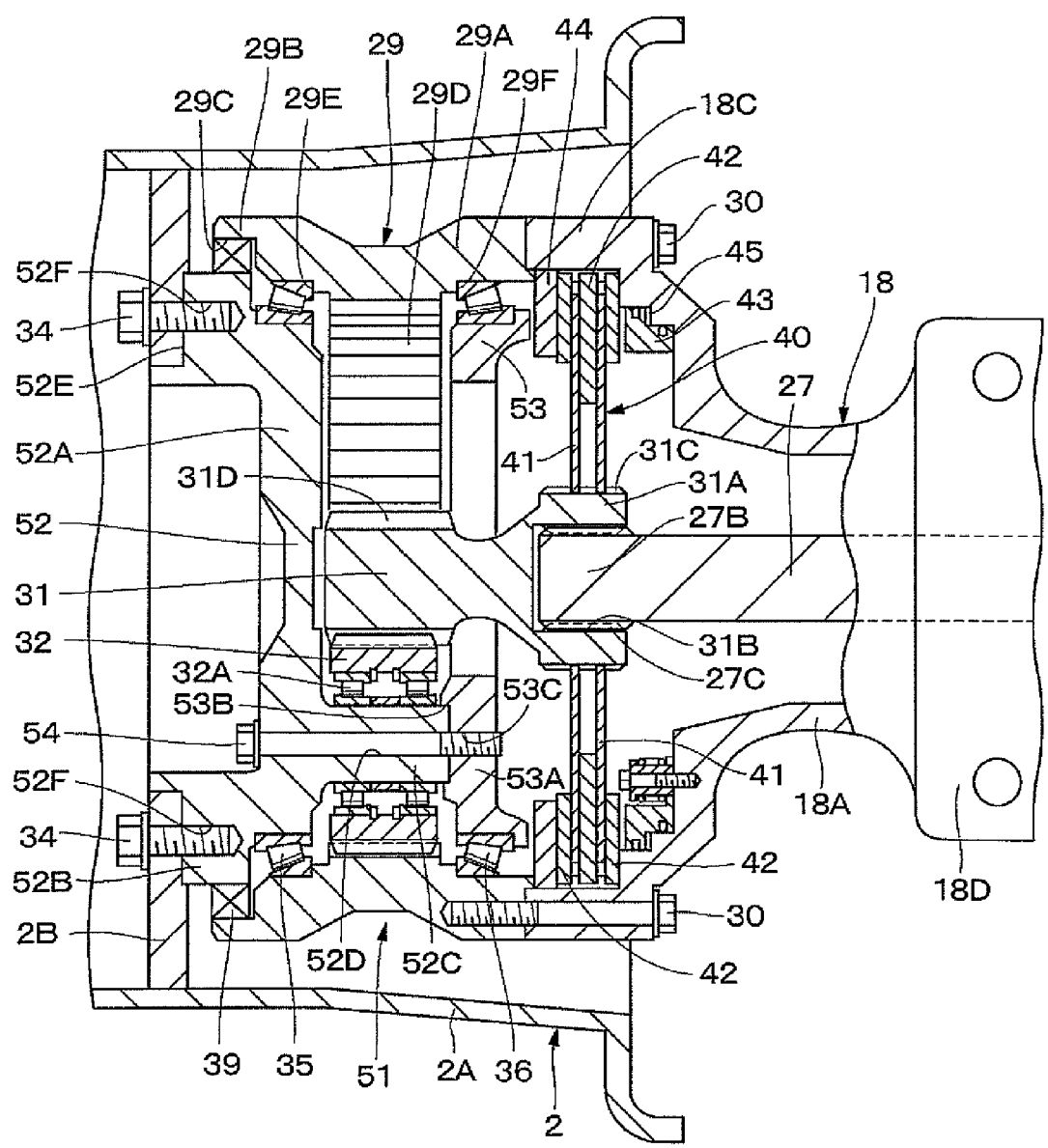
FIG. 8 is a cross sectional view as similar to FIG. 4, illustrating a brake mechanism, a planetary gear reduction mechanism and the like in a traveling axle device according to a second embodiment.
Figure 9:
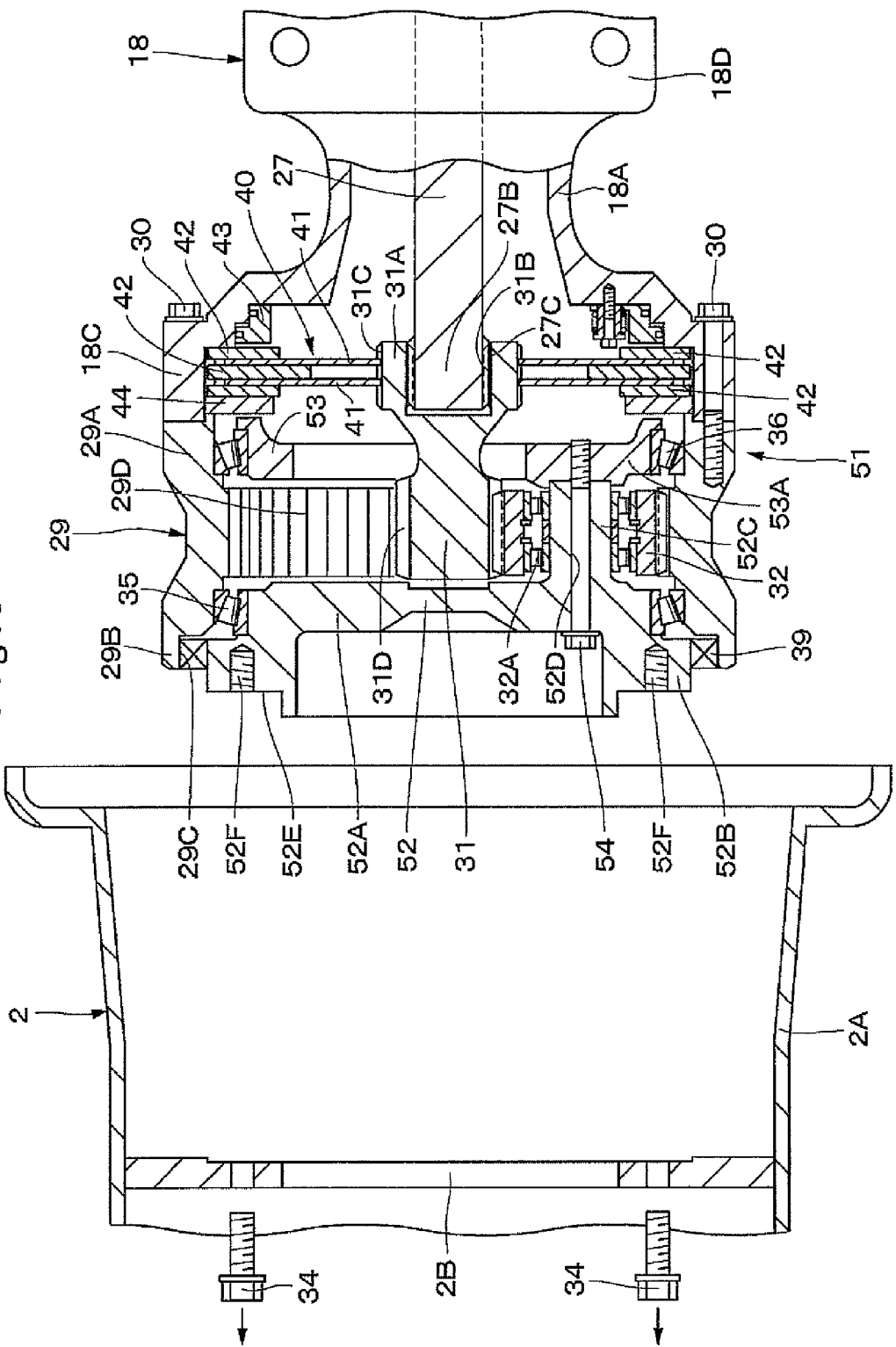
FIG. 9 is a cross sectional view illustrating a state where wheels are removed from the planetary gear reduction mechanism.
Figure 10:
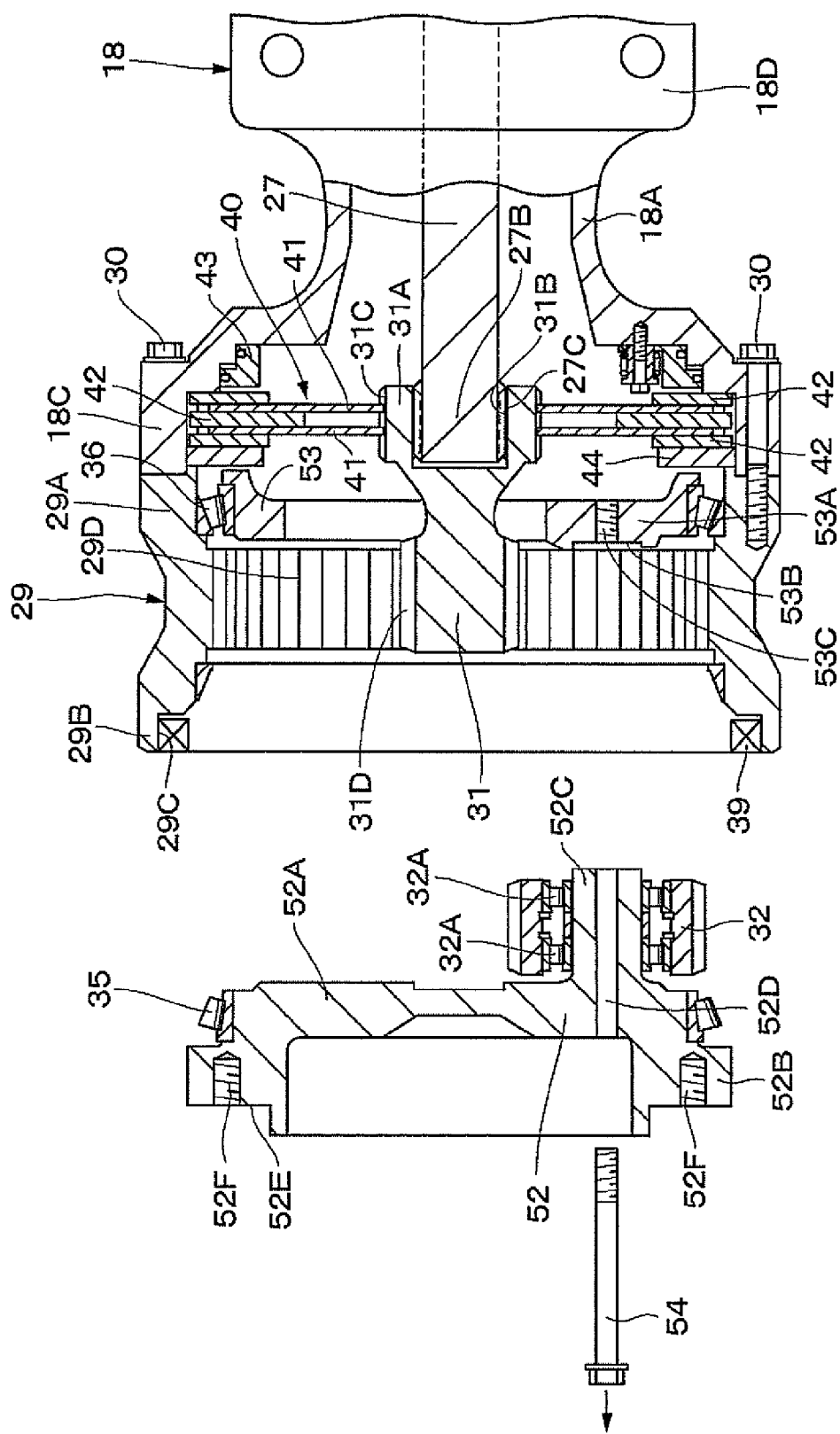
FIG. 10 is a cross sectional view illustrating a state where a carrier is removed from a reduction gear case.

Next, FIG. 8 to FIG. 10 illustrate a traveling axle device according to a second embodiment of the present invention. The second embodiment is characterized in that a gear support part of a carrier is provided with bolt through holes and a retainer is provided with female screw holes, wherein the bolts inserted in the bolt through holes from the front wheel side of the carrier are threaded in the female screw holes of the retainer. It should be noted that in the second embodiment, components identical to those in the first embodiment are referred to as identical reference numerals, and the explanation is omitted.

A planetary gear reduction mechanism 51 according to the second embodiment is, as similar to the planetary gear reduction mechanism 28 according to the first embodiment, configured of a reduction gear case 29, a sun gear 31, each of planetary gears 32, a carrier 52 to be described later, bearings 35, 36, a retainer 53 to be described later, an oil seal 39 and the like.

The carrier 52 rotatably supports each of the planetary gears 32 in the reduction gear case 29, and rotates following an orbital motion of each of the planetary gears 32. The carrier 52 is configured of a base plate part 52A rotatably supported on the inner peripheral side of the reduction gear case 29 through the bearing 35, and a cylindrical wheel mounting part 52B that projects toward the outside of the reduction gear case 29 from the base plate part 52A and on which the front wheel 2 is mounted.

The base plate part 52A is provided at the brake mechanism 40 side (base end side) with a plurality of gear support projections 52C as gear support parts rotatably supporting the respective planetary gears 32 (only one is illustrated). A bolt through hole 52D is formed in the central part of each of the gear support projections 52C to penetrate in the left-right direction. On the other hand, the wheel mounting part 52B is provided with a stepped, cylindrical fitting part 52E. The fitting part 52E is fitted in the inner peripheral side of the mounting flange 2B disposed in a rim 2A of the front wheel 2. A plurality of female screw holes 52F are formed on the end surface of the fitting part 52E over an entire circumference thereof. The inner peripheral side of the mounting flange 2B in the front wheel 2 is fitted in the fitting part 52E of the carrier 52. In this state, the bolts 34 inserted in the mounting flange 2B are threaded in the female screw holes 52F of the carrier 52. As a result, the front wheel 2 is mounted on the carrier 52.

The retainer 53 is removably mounted on each of the gear support projections 52C in the carrier 52 using an elongated bolt 54. The retainer 53 is formed in a hollow disk shape in the inner peripheral side of which the sun gear 31 is inserted, and has a plurality of mounting plate parts 53A mounted to the respective gear support projections 52C. The mounting plate part 53A is provided with a fitting recess part 53B in which a projecting end of the gear support projections 52C is fitted, and is provided with a female screw hole 53C. The female screw hole 53C corresponds to the bolt through hole 52D formed in the gear support projection 52C.

Accordingly, in a state where the fitting recess part 53B disposed in the mounting plate part 53A of the retainer 53 is fitted in each of the gear support projections 52C in the carrier 52, the elongated bolt 54 is inserted in the bolt through hole 52D from the front wheel 2 side (distal end side) of the carrier 52. When the elongated bolt 54 is threaded into the female screw hole 53C of the retainer 53, the retainer 53 can be fixed integrally with the carrier 52. As a result, the pair of bearings 35, 36 arranged to have an internal gear 29D of the reduction gear case 29 therebetween are retained to be interposed between the retainer 53 and the carrier 52.

The front axle device according to the second embodiment is configured as described above, and next, an explanation will be made of the working procedure at the time of performing the maintenance work of inspection, component replacement and the like to each of the oil seal 39, the brake mechanism 40 and the planetary gear reduction mechanism 51.

In a case of performing the maintenance work to the oil seal 39, the axle tube 18 is preliminarily mounted in the lower surface side of the front vehicle body 3. In this state, as illustrated in FIG. 9, an operator pulls bolts 34 out of the female screw holes 52F of the carrier 52 configuring the planetary gear reduction mechanism 51 and removes the front wheel 2 (mounting flange 2B) from the wheel mounting part 52B of the carrier 52.

Next, as illustrated in FIG. 10, the operator pulls the elongated bolt 54 out of the female screw hole 53C in the retainer 53, and removes the carrier 52 and the planetary gear 32 from the reduction gear case 29. Then, since the outer peripheral side of the oil seal 39 is retained on a seal mounting surface 29C of the reduction gear case 29, the inner peripheral side (lip part) of the oil seal 39 can be exposed to the outside. Therefore, since wear of the lip part making sliding contact with the carrier 52 can be accurately inspected, it is possible to accurately perform the maintenance work to the oil seal 39. On the other hand, since it is also possible to easily remove the sun gear 31 by removing the carrier 52 and the planetary gear 32, it is possible to easily perform the maintenance work to each of the planetary gear 32 and the sun gear 31.

In a case of performing the maintenance work to the brake mechanism 40, as similar to the first embodiment, bolts 30 are pulled out of a reduction gear mounting part 18C of an axle tube 18 to remove the planetary gear reduction mechanism 51. Thereby, the operator can easily access the brake mechanism 40 retained in the reduction gear mounting part 18C of the axle tube 18, and it is possible to enhance the workability of the maintenance work to rotational disks 41 and non-rotational disks 42, for example.

Figure 11:
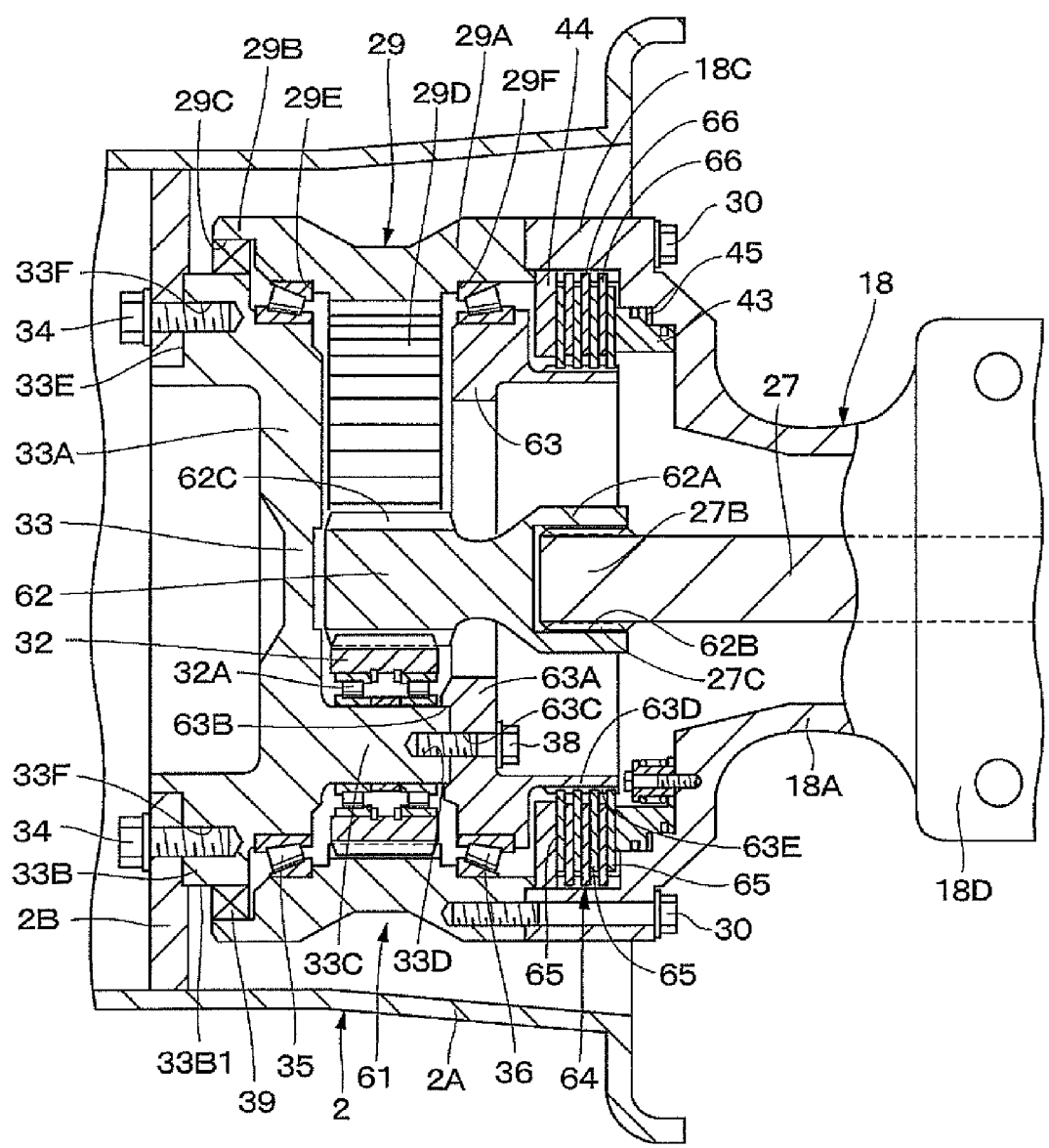
FIG. 11 is a cross sectional view as similar to FIG. 4, illustrating a brake mechanism, a planetary gear reduction mechanism and the like in a traveling axle device according to a third embodiment.

Next, FIG. 11 illustrates a traveling axle device according to a third embodiment of the present invention. The third embodiment is characterized in that a retainer is provided with a cylindrical extension cylindrical part, and rotational disks of a brake mechanism are splined to the extension cylindrical part. It should be noted that in the third embodiment, components identical to those in the first embodiment are referred to as identical reference numerals, and the explanation is omitted.

A planetary gear reduction mechanism 61 according to the third embodiment is, as similar to the planetary gear reduction mechanism 28 according to the first embodiment, configured of a reduction gear case 29, a sun gear 62 to be described later, each of planetary gears 32, a carrier 33, bearings 35, 36, a retainer 63 to be described later, an oil seal 39 and the like.

The sun gear 62 is mounted coaxially with a distal end part 27B of an axle shaft 27, and extends along the axial direction of the axle shaft 27 in the reduction gear case 29. A cylindrical shaft mounting part 62A is disposed at a differential mechanism 21 side (base end side) in the sun gear 62. A female spline 62B is formed on the inner peripheral side of the shaft mounting part 62A. The female spline 62B is splined to a male spline 27C of the axle shaft 27. A gear part 62C is formed on the outer periphery of the front wheel 2 side (distal end side) of the sun gear 62 over an entire circumference thereof. The gear part 62C is meshed with each of the planetary gears 32.

The retainer 63 is removably mounted in each of gear support projections 33C disposed in the carrier 33 using bolts 38. The retainer 63 is formed in a hollow disk shape in the inner peripheral side of which the sun gear 62 is inserted. The retainer 63 has a plurality of mounting plate parts 63A each of which is mounted to each of the gear support projections 33C. The mounting plate part 63A is provided with a fitting recess part 63B in which the gear support projection 33C is fitted, and a bolt through hole 63C corresponding to a female screw hole 33D of the gear support projection 33C. A cylindrical extension cylindrical part 63D extending into an axle tube 18 from the reduction gear case 29 is formed integrally with the retainer 63. The extension cylindrical part 63D faces the inner peripheral surface of a reduction gear mounting part 18C, and a male spline 63E is formed on the outer peripheral surface of the extension cylindrical part 63D.

The fitting recess part 63B of the retainer 37 is fitted in each of the gear support projections 33C in the carrier 33. In this state, the bolt 38 inserted in the bolt through hole 63C from the brake mechanism 64 side is threaded into the female screw hole 33D of the gear support projection 33C. Thereby, the retainer 63 can be fixed integrally with the carrier 33. In this state, the extension cylindrical part 63D of the retainer 63 faces the inner peripheral surface of the reduction gear mounting part 18C.

A brake mechanism 64 is disposed on the inner peripheral side of the reduction gear mounting part 18C disposed in the axle tube 18. The brake mechanism 64 is configured of a plurality of rotational disks 65, a plurality of non-rotational disks 66, a brake piston 43 and an endplate 44. Each of the rotational disks 65 is splined to the male spline 63E of the extension cylindrical part 63D disposed in the retainer 63 to rotate together with the carrier 33. Each of the non-rotational disks 66 is mounted on the inner periphery of the front wheel 2 side of the axle tube 18 in a non-rotational state, and faces each of the rotational disks 65 to be interposed therebetween in the left-right direction.

The brake mechanism 64 tightly holds each of the rotational disks 65 and each of the non-rotational disks 66 between the brake piston 43 and the end plate 44 to perform frictional engagement between each of the rotational disks 65 and each of the non-rotational disks 66. Thereby, the brake mechanism 64 imparts braking forces to the retainer 63 of the planetary gear reduction mechanism 61.

The front axle device according to the third embodiment is configured as described above. In the third embodiment also, as similar to the first embodiment, in a case of performing the maintenance work to the oil seal 39, the front wheel 2 is removed from a wheel mounting part 33B of the carrier 33 in a state where the axle tube 18 is mounted in the front vehicle body 3. Therefore, the oil seal 39 can be exposed to the outside to enhance the workability of the maintenance work to the oil seal 39.

On the other hand, in a case of performing the maintenance work to the brake mechanism 64, an operator removes the planetary gear reduction mechanism 61 from the reduction gear mounting part 18C of the axle tube 18 in a state where the axle tube 18 is mounted on the front vehicle body 3. Thereby, the brake mechanism 64 can be exposed to the outside, and the removed planetary gear reduction mechanism 61 can be independently placed on the working site. As a result, it is possible to enhance the maintenance work to the brake mechanism 64 and the workability of the maintenance work to the planetary gear reduction mechanism 61.

It should be noted that each of the aforementioned embodiments is explained by taking the articulate type wheel loader 1 in which the front vehicle body and the rear vehicle body are connected through the connecting mechanism 6 to be capable of bending in the left-right direction as the wheel type working machine, as an example. However, the present invention is not limited thereto, and may be applied widely to, for example, a wheel type working machine of a type for steering front wheels of a wheel hydraulic excavator or the like.

DESCRIPTION OF REFERENCE NUMERALS

2: Front wheel
3: Front vehicle body
4: Rear wheel
5: Rear vehicle body
16: Casing
17: Differential case
18: Axle tube
18C: Reduction gear mounting part
21: Differential mechanism
27: Axle shaft
28, 51, 61: Planetary gear reduction mechanism
29: Reduction gear case
29D: Internal gear
30, 34: Bolt (Fastening member)
31, 62: Sun gear
32: Planetary gear
33, 52: Carrier
33B, 52B: Wheel mounting part
33C, 52C: Gear support projection (Planetary gear support part)
33D: Female screw hole
35, 36: Bearing
37, 53, 63: Retainer
38: Bolt
39: Oil seal
40, 64: Brake mechanism
41, 65: Rotational disk
42, 66: Non-rotational disk
43: Brake piston
52D: Bolt through hole
53C: Female screw hole
54: Elongated bolt
63D Extension cylindrical part
63E Male spline

The invention claimed is:

1. A traveling axle device comprising:
a casing mounted on a vehicle body provided with left and right wheels, said casing including a differential case arranged in the intermediate part in the left-right direction and left and right axle tubes extending outside in the left-right direction from said differential case, said axle tube being formed as a reduction gear mounting part at said wheel side;
a differential mechanism disposed in said differential case;
left and right axle shafts that extend in said respective axle tubes in the left-right direction and to which rotational forces of a drive source distributed by said differential mechanism are transmitted;
left and right planetary gear reduction mechanisms mounted on said reduction gear mounting parts of said left and right axle tubes to reduce rotations of said left and right axle shafts; and
left and right brake mechanisms configured to impart braking forces to said left and right wheels, wherein
each of said planetary gear reduction mechanisms includes:
a cylindrical reduction gear case that is mounted on said reduction gear mounting part in said axle tube and that extends outside in the left-right direction from said axle tube to open at said wheel side and in which an internal gear is formed at the inner peripheral side over an entire circumference thereof;
a sun gear mounted on said axle shaft and extending along the axial direction of said axle shaft in said reduction gear case;
planetary gears that mesh with said sun gear and said internal gear and each perform an orbital motion while rotating around the periphery of said sun gear;
a carrier that rotates following the orbital motion of said planetary gears, said carrier including planetary gear support parts configured to rotatably support said planetary gears in said reduction gear case and a section axially projecting to the outside of said reduction gear case from said planetary gear support part, the section being formed as a wheel mounting part on which said wheel is removably mounted;
a retainer that is removably mounted on said planetary gear support part of said carrier;
a pair of bearings that are positioned and mounted in said internal gear in the left-right direction respectively, and rotatably support said carrier and said retainer to said reduction gear case; and
an oil seal that is provided between an inner peripheral surface of said reduction gear case at said wheel side and an outer peripheral surface of said wheel mounting part in said carrier to seal the lubricating oil in said reduction gear case, wherein
said reduction gear case is removably mounted on said reduction gear mounting part in said axle tube, and
said brake mechanism is arranged on the inner peripheral side of said reduction gear mounting part in said axle tube to be retained on the inner peripheral side of said reduction gear mounting part when said reduction gear case is removed from said reduction gear mounting part.

2. The traveling axle device according to claim 1, wherein said wheel is removably mounted in said wheel mounting part of said carrier using fastening members, and
said reduction gear case is removably mounted in said reduction gear mounting part of said axle tube using fastening members.

3. The traveling axle device according to claim 1, wherein said planetary gear support part in said carrier disposed at said brake mechanism side has an end surface provided with a female screw hole,
said retainer is provided with bolt through holes corresponding to said female screw holes, and
said retainer interposes and retains each of said bearings and said reduction gear case between said carrier and said retainer by causing a bolt inserted in said bolt through hole from said brake mechanism side of said carrier to be screwed into said female screw hole.

4. The traveling axle device according to claim 1, wherein said carrier is provided with bolt through holes penetrating in said planetary gear support parts in the left-right direction, said retainer is provided with a female screw hole in a position corresponding to said bolt through hole, and said retainer interposes and retains each of said bearings and said reduction gear case between said carrier and said retainer by screwing a bolt inserted in said bolt through hole from said wheel side of said carrier into said female screw hole.

5. The traveling axle device according to claim 1, wherein said brake mechanism includes:

a plurality of rotational disks rotating together with said axle shaft;

a plurality of non-rotational disks facing each of said rotational disks that are interposed therebetween in the left-right direction and mounted in a non-rotational state on the inner periphery of said wheel side of said axle tube; and a piston that pushes said non-rotational disk against said rotational disk to generate braking forces thereto, wherein said rotational disk is splined to said sun gear of said planetary gear reduction mechanism.

6. The traveling axle device according to claim 1, wherein said brake mechanism includes:

a plurality of rotational disks rotating together with said axle shaft;

a plurality of non-rotational disks facing each of said rotational disks that are interposed therebetween in the left-right direction and mounted in a non-rotational state on the inner periphery of said wheel side of said axle tube; and a piston that pushes said non-rotational disks against said rotational disks to generate braking forces thereto, wherein said retainer is provided with a cylindrical extension cylindrical part extending into said axle tube from said reduction gear case, and said rotational disk is splined to said extension cylindrical part of said retainer.

\* \* \* \* \*